UNITED STATES PATENT OFFICE.

JOHN W. DUNFORD, OF ATLANTA, GEORGIA, ASSIGNOR TO REESE-HERRIN COMPANY, OF ATLANTA, GEORGIA, A CORPORATION.

PAINT COMPOUND.

1,091,309. Specification of Letters Patent. Patented Mar. 24, 1914.

No Drawing. Application filed October 4, 1913. Serial No. 793,445.

*To all whom it may concern:*

Be it known that I, JOHN W. DUNFORD, a citizen of the United States, residing at Atlanta, in the county of Fulton and State of Georgia, have invented certain new and useful Improvements in Paint Compounds, of which the following is a specification.

This invention relates to improvements in paints or paint compounds and has for its primary object an improved paint compound which will possess to a high degree the characteristic of capability of resisting the action of the elements, both air and water, and which will be found particularly desirable and effective as a coating or impregnating fluid for roofs and bridges or wherever it is desired to preserve any structures, especially those that are exposed.

With this and other objects in view, as will more fully appear as the description proceeds, the invention consists in a paint compound composed of some or all of the ingredients hereinbelow named and mixed substantially in or about the proportions specified, namely:

| | |
|---|---|
| Coal tar | 25 gallons. |
| Oil of tar | 25 gallons. |
| Graphite | 25 pounds. |
| Linseed oil | 5 gallons. |
| Yellow ocher | 15 pounds. |
| Oxid of iron | 20 pounds. |
| Spirits of turpentine | 5 gallons. |

In carrying out my invention, I take about twenty-five gallons of coal tar (preferably Jellico coal tar) and twenty-five gallons of oil of tar and put them in a distillery and distil for about twelve or fourteen minutes, all imperfections being distilled out. These two ingredients constitute the body of my improved paint compound and, as is manifest, this body not only possesses considerable tensile strength as well as elasticity, but it is capable of resisting wear and the action of the elements to a maximum degree.

I next take twenty-five pounds of graphite to five gallons of linseed oil (well ground) and I then take fifteen pounds of yellow ocher, twenty pounds of oxid of iron (also ground in oil) with five gallons of turpentine for a drier and mixer. While the tar compound is yet warm, these other ingredients are thoroughly mixed therewith and ground together, resulting in about sixty-five gallons of the paint compound ready for use in connection with all manner of roofing and bridge work, as well as for other work generally.

While my paint compound is primarily designed for use on roofs and bridges, I have clearly demonstrated that it is also effective on the hulls or bottoms of marine vessels, as it is impervious to salt or fresh water, and that it is useful not only for iron and steel bridges, but wooden bridges, posts or any part which it is desired to hold in a good state of preservation after being partially or entirely buried in the ground. It will be found to be absolutely water-proof.

While the tars, in their crude form, have heretofore been considered somewhat injurious, especially to metal roofing, I have found that by distilling out the imperfections, the paint compound will be as harmless as any oil paint which has been produced, while my experience has at the same time shown that the great body and durability inherent in these tars makes them a peculiarly good body to combine the other ingredients with.

While the foregoing description specifies what I have found to be the preferred ingredients for producing my improved compound and the preferred proportions of the different ingredients, yet it is to be understood that the invention is not limited thereto, but that various changes may be made in these respects, without departing from the scope of the invention as defined in the appended claims.

What I claim is:—

1. The herein described paint compound, consisting of a body composed of coal tar and oil of tar, said body being mixed with graphite, linseed oil, yellow ocher, oxid of iron and spirits of turpentine.

2. The herein described paint compound, consisting of the following ingredients in substantially the specified proportions, namely, a body composed of coal tar twenty-five gallons and oil of tar twenty-five gallons, mixed with graphite twenty-five pounds, linseed oil five gallons, yellow ocher fifteen pounds, oxid of iron twenty pounds and spirits of turpentine five gallons.

In testimony whereof I hereunto affix my signature in the presence of two witnesses.

JOHN W. DUNFORD.

Witnesses:
CLARICE FAIR,
D. B. KENDRICK.

Copies of this patent may be obtained for five cents each, by addressing the "Commissioner of Patents, Washington, D. C."